United States Patent Office 2,945,834
Patented July 19, 1960

2,945,834
VULCANIZABLE RUBBER COMPOSITION AND PROCESS FOR VULCANIZING SAME

David James Bryans Coulter and Vincent Kerrigan, Manchester, England, assignors to Imperial Chemical Industries Limited, London, England, a corporation of Great Britain No Drawing. Filed Feb. 4, 1957, Ser. No. 637,860

Claims priority, application Great Britain Jan. 30, 1957

7 Claims. (Cl. 260—41.5)

This invention relates to an improved vulcanization process for rubber, and more particularly it relates to an improved vulcanization process for rubber stocks containing a reinforcing type furnace black.

The incorporation of a furnace black in rubber tends to cause the resultant rubber stock to scorch during processing. This tendency to scorch cannot be effectively controlled by the addition of all substances which are effective scorch-inhibitors in gum and channel black stocks. Also some substances which are effective retarders in furnace black stocks are subject to certain disadvantages.

Thus, for example, the tendency to scorch can be reduced by incorporating in the rubber stock a nitrosamine, for example N-nitrosodiphenylamine or N-nitroso-2:2:4-trimethyl-1:2-dihydroquinoline but there is a tendency for retarders of this type to produce under certain circumstances a porous vulcanizate.

We have now found that vulcanizable rubber compositions particularly those containing a reinforcing type furnace black can be processed with a high margin of safety, possess a reduced tendency to scorch, and produce a non-porous vulcanizate, when there is incorporated therein an accelerator and sulphamic acid and/or certain derivatives thereof.

Thus according to our invention we provide an improved process for the vulcanization of rubber characterised in that there is incorporated therein a vulcanizing agent and an accelerator and a substance of the formula:

$$R_1[R_2NSO_2X]_n$$

wherein $n$ stands for 1 or 2 and wherein $R_1$ stands for a hydrocarbon radical, optionally substituted, or, when $n$ is 1, for hydrogen or for a hydrocarbon radical, optionally substituted, $R_2$ stands for hydrogen or for a hydrocarbon radical, optionally substituted, and when $n$ is 1, $R_1$ and $R_2$ together may form, together with the adjacent nitrogen atom, part of a heterocyclic ring, and wherein X stands for OM (wherein M stands for a metal or ammonium), $OR_1$, or for $NR_3R_4$ wherein $R_3$ and $R_4$ each stand for hydrogen or for hydrocarbon radicals, optionally substituted, and which may together with the adjacent nitrogen atom form part of a heterocyclic ring.

As examples of substances of the stated formula there may be mentioned sulphamic acid, 4:4'-sulphonyldimorpholine, 1:4-bis(dimethylsulphamyl) piperazine, zinc sulphamate, sodium sulphamate, calcium sulphamate, magnesium sulphamate, aluminium sulphamate, 2:4-dichlorophenyl dimethylsulphamate, p-cyclohexylphenyl dimethylsulphamate and cyclohexylsulphamic acid. It is preferred to use sulphamic acid or its salts.

The amount of the said substance which may be added may be up to 3% and is preferably not more than 1.0% on the rubber hydrocarbon.

The process of the present invention is particularly suitable for the vulcanization of rubber stocks containing a reinforcing type furnace black. The term "reinforcing type furnace black" is used in a broad sense to mean furnace blacks more reinforcing in effect than mere diluents and includes semi-reinforcing furnace blacks and high reinforcing furnace blacks, for example those referred to in the trade as fine furnace black, high modulus furnace black, medium abrasion furnace black, high abrasion furnace black, and super abrasion furnace black.

As accelerators which may be incorporated in the rubber in the process of our invention there are preferably used delayed action accelerators for example those delayed action accelerators of the sulphenamide type or those containing a thiazole nucleus. Thus there may be mentioned as suitable accelerators thiazole sulphenamides prepared from amines containing alkyl, especially tertiary alkyl or cycloalkyl, or heterocyclic radicals such as N-tert. - butylbenzthiazylsulphenamide, N - tert. - octylbenzthiazylsulphenamide, N-cyclohexylbenzthiazyl sulphenamide, benzthiazyl sulphenmorpholide and benzthiazyl sulphenpiperidide; also mercaptobenzthiazoles wherein the hydrogen of the mercapto group is substituted by an organic radical, such as 2:4-dinitrophenyl-2-benzthiazyl monosulphide, ethylbenzthiazyl disulphide, and 2:2'-dibenzthiazyl disulphide and guanidine derivatives for example diphenylguanidine and di-o-tolylguanidine. The accelerator may for example be used in quantities up to 2% on the rubber hydrocarbon.

The amount of vulcanizing agent, which is preferably sulphur, used in the process of our invention may be for example between 1% and 3%.

The rubbers which may be vulcanized by the process of the present invention include natural rubber and synthetic rubber for example polymers of butadiene-1:3 and 2-methylbutadiene-1:3, and, copolymers of these compounds with acrylonitrile, styrene, methyl methacrylate and other well known polymerisable compounds used in the manufacture of these rubbers. As used in the claims, the term polymers includes such copolymers.

The rubber may also contain, incorporated therein, other known adjuvants, for example zinc oxide, pigments, antioxidants, peptisers and softeners.

The vulcanization of the rubber may be carried out under conditions known in the art, for example by heating at temperatures between 130° C. and 150° C. for example 30 to 60 minutes.

Rubber containing a reinforcing type furnace black when vulcanized by the process of our invention possesses excellent and uniform physical properties, and the unvulcanized stocks may be processed with a high degree of safety, as shown, for example by the scorching times at 110° C., as measured on a Mooney Plastometer. These scorching times are increased by as much as by 45% as compared with a mix containing none of the substances as hereinbefore defined. White base stocks vulcanized by the process of our invention produce a non-stained, non-porous vulcanizate.

The invention is illustrated but not limited by the following examples in which the parts are by weight:

EXAMPLE 1

A rubber stock is made up from the following ingredients:

| | Parts |
|---|---|
| Smoked sheet rubber | 100 |
| Zince oxide | 5 |
| Philblack O furnace black | 47.5 |
| Stearic acid | 3 |
| Sulphur | 2.5 |
| N-cyclohexylbenzthiazylsulphenamide | 0.65 |
| Sulphamic acid | 0.5 |

This rubber stock is submitted to the Mooney scorching test at 110° C. and is found to show a scorching time of 64 minutes. A rubber stock made up from the same proportions of the same ingredients, but omitting the sulphamic acid, is found to show a scorching time of 44 minutes in the Mooney scorching test at 110° C.

EXAMPLE 2

A rubber stock made up as described in Example 1, but substituting 0.5 part of 4:4'-sulphonyldimorpholine for the 0.5 part of sulphamic acid, is found to show a scorching time of 51 minutes in the Mooney scorching test at 110° C.

EXAMPLE 3

A rubber stock made up as described in Example 1 but substituting 0.5 part of 1:4-bisdimethylsulphamylpiperazine for the 0.5 part of sulphamic acid, is found to have a scorching time of 50 minutes in the Mooney scorching test at 110° C.

The 1:4-bisdimethylsulphamylpiperazine used in the process of the above example is a new compound and may be obtained by the action of dimethylaminosulphonyl chloride on piperazine in the presence of an acid-binding agent.

EXAMPLE 4

A rubber stock made up as described in Example 1 but substituting 0.5 part of zinc sulphamate for the 0.5 part of sulphamic acid, is found to show a scorching time of 60 minutes in the Mooney scorching test at 110° C.

EXAMPLE 5

A rubber stock made up as described in Example 1 but substituting 0.5 part of 2:4-dichlorophenyldimethylsulphamate for the 0.5 part of sulphamic acid, is found to have a scorching time of 53 minutes in the Mooney scorching test at 110° C.

The 2:4-dichlorophenyldimethylsulphamate used in the process of the above example is a new compound and may be obtained by the action of dimethylaminosulphonyl chloride on 2:4-dichlorophenol in the presence of an acid-binding agent.

EXAMPLE 6

A rubber stock made up as described in Example 1, but substituting 0.5 part of p-cyclohexylphenyl dimethylsulphamate for the 0.5 part of sulphamic acid, is found to show a scorching time of 53 minutes in the Mooney scorching test at 110° C.

The p-cyclohexylphenyl dimethylsulphamate used in the process of the above example is a new compound and may be obtained by the action of dimethyl aminosulphonyl chloride on p-cyclohexylphenol in the presence of an acid-binding agent.

EXAMPLE 7

A rubber stock made up as described in Example 1, but substituting 0.5 part of calcium sulphamate for the 0.5 part of sulphamic acid, is found to show a scorching time of 60 minutes.

EXAMPLE 8

A rubber stock made up as described in Example 1, but substituting 0.5 part of magnesium sulphamate for the 0.5 part of sulphamic acid is found to show a scorching time of 62 minutes.

EXAMPLE 9

A rubber stock made up as described in Example 1, but substituting 0.5 part of aluminium sulphamate for the 0.5 part of sulphamic acid is found to show a scorching time of 59 minutes.

EXAMPLE 10

A rubber stock made up as described in Example 1, but substituting 0.5 part of sodium sulphamate for the 0.5 part of sulphamic acid is found to show a scorching time of 53 minutes.

EXAMPLE 11

Furnace black tread compounds are made up from the following ingredients:

|  | A | B | C |
|---|---|---|---|
| Smoked sheet | 100 | 100 | 100 |
| Zinc oxide | 5 | 5 | 5 |
| Kosmos 85 Super Abrasion Furnace Black | 47.5 | 47.5 | 47.5 |
| Stearic acid | 3 | 3 | 3 |
| Sulphur | 2.5 | 2.5 | 2.5 |
| N-cyclohexylbenzthiazyl sulphenamide | 0.65 | 0.65 | 0.65 |
| Sulphamic acid | -------- | 0.75 | 1.0 |

These compounds are submitted to the Mooney Scorching Test at 110° C., and the following results are obtained:

|  | A | B | C |
|---|---|---|---|
| Plasticity after 4 minutes | 96 | 98 | 98. |
| Time to reach Mooney value 10 units above minimum | 32 minutes | 38 minutes | 45 minutes. |
| Time to reach Mooney value 20 units above minimum | 33 minutes | 39 minutes | 46 minutes. |

EXAMPLE 12

Furnace black tread compounds are made up from the following ingredients:

|  | D | E |
|---|---|---|
| Smoked sheet | 100 | 100 |
| Zinc oxide | 5 | 5 |
| Kosmos 60 High Abrasion Furnace Black | 47.5 | 47.5 |
| Stearic Acid | 3 | 3 |
| Sulphur | 2.5 | 2.5 |
| Mercaptobenzthiazole | 0.65 | 0.65 |
| Sulphamic acid | -------- | 0.5 |

These compounds are submitted to the Mooney scorching test at 120° C., and the following results are obtained:

|  | D | E |
|---|---|---|
| Plasticity after 4 minutes | 35 | 37. |
| Time to reach Mooney Value 10 units above minimum | 11 minutes | 13 minutes. |
| Time to reach Mooney Value 100 | 15 minutes | 17 minutes. |

EXAMPLE 13

Rubber stocks are made up from the following ingredients:

|  | F | G |
|---|---|---|
| Smoked sheet | 100 | 100 |
| Zinc oxide | 5 | 5 |
| Kosmos 60 High Abrasion Furnace Black | 47.5 | 47.5 |
| Stearic Acid | 3 | 3 |
| Sulphur | 2.5 | 2.5 |
| Benzothiazyl disulphide | 0.65 | 0.65 |
| Sulphamic acid | -------- | 0.5 |

These stocks are submitted to the Mooney Scorching Test at 120° C., and the following results are obtained:

|  | F | G |
|---|---|---|
| Plasticity after 4 minutes | 47 | 47 |
| Time to reach Mooney value 10 units above minimum | 14 minutes | 18 minutes. |
| Time to reach Mooney value 20 units above minimum | 16 minutes | 21 minutes. |

EXAMPLE 14

Rubber stocks are made up from the following ingredients:

|  | H | J |
|---|---|---|
| Pale crepe | 100 | 100 |
| Zinc oxide | 10 | 10 |
| Blanc fixe | 75 | 75 |
| Stearic acid | 1 | 1 |
| Sulphur | 2.5 | 2.5 |
| Mercaptobenzthiazole | 0.5 | 0.5 |
| Sulphamic acid |  | 0.3 |

The stocks are submitted to the Mooney Scorching Test at 120° C., and the following results are obtained:

|  | H | J |
|---|---|---|
| Plasticity after 4 minutes | 47 | 44. |
| Time to reach Mooney value 10 units above minimum | 13 minutes | 21 minutes. |
| Time to reach Mooney value 100 | 18 minutes | 30 minutes. |

EXAMPLE 15

Cable insulation compounds are made up from the following ingredients:

|  | K | L |
|---|---|---|
| Smoked sheet | 100 | 100 |
| Zinc oxide | 5 | 5 |
| Talc | 50 | 50 |
| China clay (Kaolin) | 50 | 50 |
| Paraffin wax | 3 | 3 |
| Stearic acid | 1 | 1 |
| Acetone (Diphenylamine condensate) | 1 | 1 |
| Sulphur | 1.25 | 1.25 |
| Mercaptobenzthiazole | 1.125 | 1.125 |
| Zinc diethyldithio carbamate | 0.375 | 0.375 |
| Sulphamic acid |  | 0.5 |

The compounds have the following properties:

*Press cured—15 seconds at 198° C.*

|  | K | L |
|---|---|---|
| Tensile strength (kg./sq. cm.) | 167 | 165. |
| Modulus at 300% (kg./sq. cm.) | 68 | 79. |
| Elongation at Break (percent) | 475 | 490. |
| Hardness (BS°) | 62 | 61. |
| Resilience at 50° C. (percent) | 66 | 62. |

MOONEY SCORCHING AT 120° C.

|  | K | L |
|---|---|---|
| Plasticity after 4 minutes | 48 | 50. |
| Time to reach Mooney value 10 units above minimum | 8 minutes | 14 minutes. |
| Time to reach Mooney value 100 | 9 minutes | 17 minutes. |
| Volume Resistivity at 20° C. (ohm. cm.) x $10^{15}$ | 11.13 | 13.55. |

EXAMPLE 16

Rubber stocks are made up from the following ingredients:

|  | M | N | P |
|---|---|---|---|
| Polysar Krylene (GR-S) | 100 | 100 | 100 |
| Zinc oxide | 5 | 5 | 5 |
| Stearic acid | 3 | 3 | 3 |
| Kosmos 85 Super Abrasion Furnace Black | 47.5 | 47.5 | 47.5 |
| Sulphur | 2 | 2 | 2 |
| N-cyclohexylbenzthiazyl sulphenamide | 1.5 | 1.5 | 1.5 |
| Sulfamic acid |  | 0.5 | 1 |

*Physical test results*

| Property | Cure (141° C.) | M | N | P |
|---|---|---|---|---|
|  | min. |  |  |  |
| Tensile strength (kg./sq. cm.) | 15 | 267 | 260 | 228 |
|  | 20 | 277 | 265 | 256 |
|  | 30 | 256 | 222 | 263 |
|  | 45 | 232 | 244 | 237 |
| Modulus 300% (kg./sq. cm) | 15 | 166 | 126 | 96 |
|  | 20 | 213 | 178 | 150 |
|  | 30 | 224 | 198 | 173 |
|  | 45 | 236 | 210 | 192 |
| Elongation at break (percent) | 15 | 443 | 495 | 538 |
|  | 20 | 392 | 419 | 456 |
|  | 30 | 358 | 358 | 421 |
|  | 45 | 328 | 358 | 369 |
| Hardness (BS°) | 15 | 74 | 72 | 72 |
|  | 20 | 76 | 75 | 75 |
|  | 30 | 77 | 76 | 74 |
|  | 45 | 77 | 75 | 74 |
| Resilience 50° C. (percent) | 15 | 43 | 40 | 37 |
|  | 20 | 43 | 42 | 41 |
|  | 30 | 45 | 43 | 42 |
|  | 45 | 43 | 43 | 43 |

*Mooney Scorching Test at 120° C.*

|  | M | N | P |
|---|---|---|---|
| Plasticity after 4 minutes | 53 | 54 | 53 |
| Time to reach Mooney value 10 units above minimum (minutes) | 45 |  |  |
| Time to reach Mooney value 20 units above minimum (minutes) | 48 |  |  |
| Time to reach Mooney value 100 (minutes) | 52 | >75 | >75 |

What we claim is:

1. A process for vulcanizing a rubbery polymer of a monomer selected from the group consisting of butadiene-1:3 and 2-methyl butadiene-1:3 which comprises heating said polymer at a vulcanizing temperature in the presence of between about 1 and about 3 percent of a rubber vulcanizing agent, up to about 2 percent of a rubber vulcanizing accelerator containing the thiazole nucleus and between about 0.2 and 3 percent of a compound selected from the group consisting of sulphamic acid, salts of sulphamic acid, 4:4-sulphonyldimorpholine, 1:4-bis (dimethylsulphamyl) piperazine, 2:4-dichlorophenyl dimethylsulphamate, p-cyclohexylphenyl dimethylsulphamate and cyclohexyl sulphamic acid.

2. A process for vulcanizing as set forth in claim 1 in which said compound is sulphamic acid.

3. A process for vulcanizing as set forth in claim 1 in which said compound is 4:4'-sulfonyldimorpholine.

4. A process for vulcanizing as set forth in claim 1 in which said compound is 1:4-bis-(dimethylsulfonyl) piperazine.

5. A process for vulcanizing as set forth in claim 1 in which said rubbery polymer contains reinforcing furnace black.

6. A process for vulcanizing as set forth in claim 1 in which said vulcanizing agent is sulfur.

7. A vulcanizable rubber composition consisting essentially of a rubbery polymer of a monomer selected from the group consisting of butadiene-1:3 and 2-methyl butadiene-1:3, between about 1 and about 3 percent of a rubber vulcanizing agent, up to about 2 percent of a rubber vulcanizing accelerator containing the thiazole nucleus and between about 0.2 and 3 percent of a compound selected from the group consisting of sulphamic acid, salts of sulphamic acid, 4:4-sulphonyldimorpholine, 1:4-bis (dimethylsulphamyl) piperazine, 2:4-dichlorophenyl dimethylsulphamate, p-cyclohexylphenyl dimethylsulphamate and cyclohexyl sulphamic acid.

References Cited in the file of this patent

UNITED STATES PATENTS 2,704,761    D'Amico _____ Mar. 22, 1955